(12) United States Patent
Huang et al.

(10) Patent No.: US 11,507,910 B2
(45) Date of Patent: Nov. 22, 2022

(54) EQUIPMENT MANAGEMENT METHOD AND SYSTEM BASED ON RADIO FREQUENCY IDENTIFICATION

(71) Applicants: Inventec (Pudong) Technology Corporation, Shanghai (CN); INVENTEC CORPORATION, Taipei (TW)

(72) Inventors: Chu-Li Huang, Taipei (TW); Jung-Jen Hsu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 231 days.

(21) Appl. No.: 17/122,139

(22) Filed: Dec. 15, 2020

(65) Prior Publication Data

US 2022/0076186 A1 Mar. 10, 2022

(30) Foreign Application Priority Data

Sep. 7, 2020 (CN) .......................... 202010927355.0

(51) Int. Cl.
| | | |
|---|---|---|
| *G06Q 10/00* | (2012.01) | |
| *G06Q 10/06* | (2012.01) | |
| *G06K 19/07* | (2006.01) | |
| *G06Q 30/00* | (2012.01) | |
| *G06Q 50/04* | (2012.01) | |
| *G06K 7/10* | (2006.01) | |

(52) U.S. Cl.
CPC ... *G06Q 10/06395* (2013.01); *G06K 7/10297* (2013.01); *G06K 19/0723* (2013.01); *G06Q 30/0185* (2013.01); *G06Q 50/04* (2013.01); *G06K 2007/10504* (2013.01)

(58) Field of Classification Search
CPC ............ G06Q 10/06395; G06Q 50/04; G06K 7/10297; G06K 19/0723
USPC ....................................................... 705/7.41
See application file for complete search history.

(56) References Cited

U.S. PATENT DOCUMENTS

| | | | | |
|---|---|---|---|---|
| 2006/0226982 A1* | 10/2006 | Forster | ............... | G06K 7/10465 340/572.1 |
| 2009/0224778 A1* | 9/2009 | Sato | .................... | G01R 31/2822 324/750.01 |
| 2009/0322372 A1* | 12/2009 | Stenzel | .............. | G01R 31/2822 324/762.07 |
| 2015/0355279 A1* | 12/2015 | Rogel-Favila | ..... | G01R 31/2893 324/750.25 |
| 2021/0064491 A1* | 3/2021 | Chang | .................. | G06F 11/2284 |
| 2021/0279433 A1* | 9/2021 | Kan | ........................ | H04B 7/216 |

* cited by examiner

*Primary Examiner* — Ahshik Kim

(74) *Attorney, Agent, or Firm* — Locke Lord LLP; Tim Tingkang Xia, Esq.

(57) ABSTRACT

An equipment management method based on radio frequency identification comprises binding a first electronic tag and second electronic tags, reading the first electronic tag in a search mode, obtaining an abnormality list of one or more abnormal tags in the second electronic tags according to the first electronic tag, reading one of the second electronic tags in the search mode, and outputting an error signal when the read second electronic tag matches up to the abnormality list. The first electronic tag is set on a test machine, the second electronic tag are respectively set on test elements, and the test elements are disposed in the test machine.

10 Claims, 6 Drawing Sheets

EQUIPMENT MANAGEMENT METHOD AND SYSTEM BASED ON RADIO FREQUENCY IDENTIFICATION

CROSS-REFERENCE TO RELATED APPLICATIONS

This non-provisional application claims priority under 35 U.S.C. § 119(a) on Patent Application No(s). 202010927355.0 filed in China on Sep. 7, 2020, the entire contents of which are hereby incorporated by reference.

BACKGROUND

1. Technical Field

This disclosure relates to an equipment management method, and particularly to an equipment management method based on radio frequency identification.

2. Related Art

Recently, a function test procedure is performed by releasing test elements from a warehouse, and then installing the test elements in each function test machine by production line personnel. The identity of each test element is marked with 2D or 1D barcode which can be tested by optical scanning. When there are a large number of test elements disposed in the test machine, the optical scanning test method cannot detect the test elements inside the machine, and it is impossible to exactly know which test element should be replaced. Therefore, the machine should be disassembled to expose the barcodes of the test elements inside the machine for being optical scanned, and this process is very time-consuming and inefficient.

SUMMARY

Accordingly, this disclosure provides an equipment management method and an equipment management system based on the radio frequency identification.

According to an embodiment of this disclosure, an equipment management method based on radio frequency identification comprises binding a first electronic tag and second electronic tags, reading the first electronic tag in a search mode, obtaining an abnormality list of one or more abnormal tags in the second electronic tags according to the first electronic tag, reading one of the second electronic tags in the search mode, and outputting an error signal when the read second electronic tag matches up to the abnormality list. The first electronic tag is set on a test machine, the second electronic tag are respectively set on test elements, and the test elements are disposed in the test machine.

According to an embodiment of this disclosure, an equipment management system based on radio frequency identification comprises a reading device and a computing device connected with the reading device. The reading device is configured to reading a first electronic tag in a search mode, and obtaining an abnormality list of one or more abnormal tags in second electronic tags according to the first electronic tag, to read one of the second electronic tags in the search mode, and to output an error signal when the read second electronic tag matches up to the abnormality list. The computing device is configured to provide the abnormality list to the reading device according to the first electronic tag. The first electronic tag is set on a test machine, the second electronic tag are respectively set on test elements, the test elements are disposed in the test machine, and the reading device and the computing device are further configured to bind the first electronic tag and the second electronic tags.

In view of the above description, the equipment management method and system based on radio frequency identification provided in this disclosure may read the electronic tags of test elements inside a test machine without disassembling the test machine. By the specific binding task and searching task of the equipment management method and system provided in this disclosure, the amount of comparison data in the search for the test elements that need to be replaced may be reduced, thereby reducing the computation load and speeding up the execution speed. Moreover, instead of a reading device with a high computing power, a low-cost device may be used to perform the search task in this disclosure, thereby reducing the cost of system setup.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
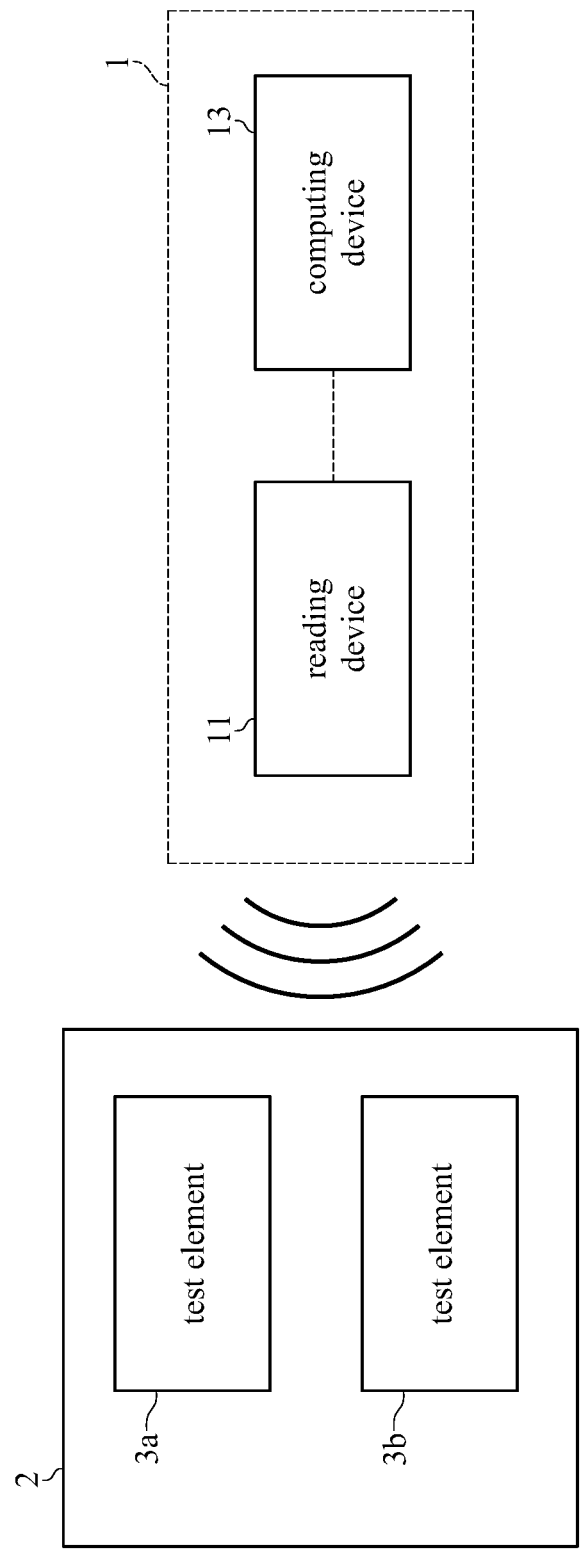
FIG. 1 is a function block diagram of an equipment management system based on radio frequency identification according to an embodiment of this disclosure.

Please refer to FIG. 1, which is a function block diagram of an equipment management system based on radio frequency identification according to an embodiment of this disclosure. As shown in FIG. 1, an equipment management system 1 is configured to manage multiple test elements 3a and 3b (collectively referred to as equipment) disposed in a test machine 2. For example, the test machine 2 is a board function test (BFT) machine of a server, and is equipped with multiple embedded test elements 3a and 3b, such as PCIe test adapters, test memories or other test elements used to test motherboards. A first electronic tag is set on the test machine 2, and each of the test elements 3a and 3b has a second electronic tag set thereon. The first electronic tag and the second electronic tag belong to radio frequency identification (RFID) tags, and can have different encoding methods (such as setting different start code, middle code or end code) to represent a test machine and a test element respectively. More specifically, the encoding method of the first electronic tag can indicate that the first electronic tag belongs to a test machine, and the encoding method of the second electronic tag can indicate that the second electronic tag belong to a test element. It should be noted that, FIG. 1 exemplarily illustrates one test machine 2 and two test elements 3a and 3b disposed in it, but the number of the test machine and the test elements managed by the equipment management system 1 is not limited to this. In other embodiments, the equipment management system 1 can manage the test element(s) in multiple test machines, and there can be one or more test elements in each test machine.

The equipment management system 1 comprises a reading device 11 and a computing device 13, wherein the reading device 11 can be connected with the computing device 13 via a wireless network, and both can be disposed in the workstation and backstage where the test machine 2 is disposed. For example, the reading device 11 is a handheld device that can read RFID tags, and the computing device 13 is the host of the backstage server. The reading device 11 can use Wi-Fi network connection (such as IEEE802.11b/g wireless standard and Wi-Fi security encryption mechanism) to exchange packet data with the system interface of the computing device 13 and download the required data from the database of the computing device 13 to its own memory card (such as SD card). The reading device 11 can have multiple modes and use one of them to read an electronic tag, exchange the read data with the computing device and process the read data, and output the processing result in the form of display picture or sound. The multiple modes can include one or more of a binding mode, a search mode, an unbinding mode and a free reading mode, wherein the detailed procedures are described later. When the reading device 11 transmits data to the computing device 13, the reading device can also transmit an indication signal of the mode of the reading device 11, so that the computing device 13 can determine which mode of processing procedure to perform on the received data.

Besides the communication connection with the reading device 11, the computing device 13 can also have a communication connection (such as Wi-Fi) with the test machine 2. As completing a test using the test element 3a/3b, the test machine 2 transmits the test result (such as log file) to the computing device 13. The computing device 13 accumulates the number of operations of the test element 3a/3b based on the test result and records the number. When the number of operations of the test element 3a/3b is accumulated to the level at which the test element 3a/3b needs to be replaced (e.g. about 5% remaining in service life), the computing device 13 marks the second electronic tag of the test element 3a/3b as needing replacement.

Figure 2:
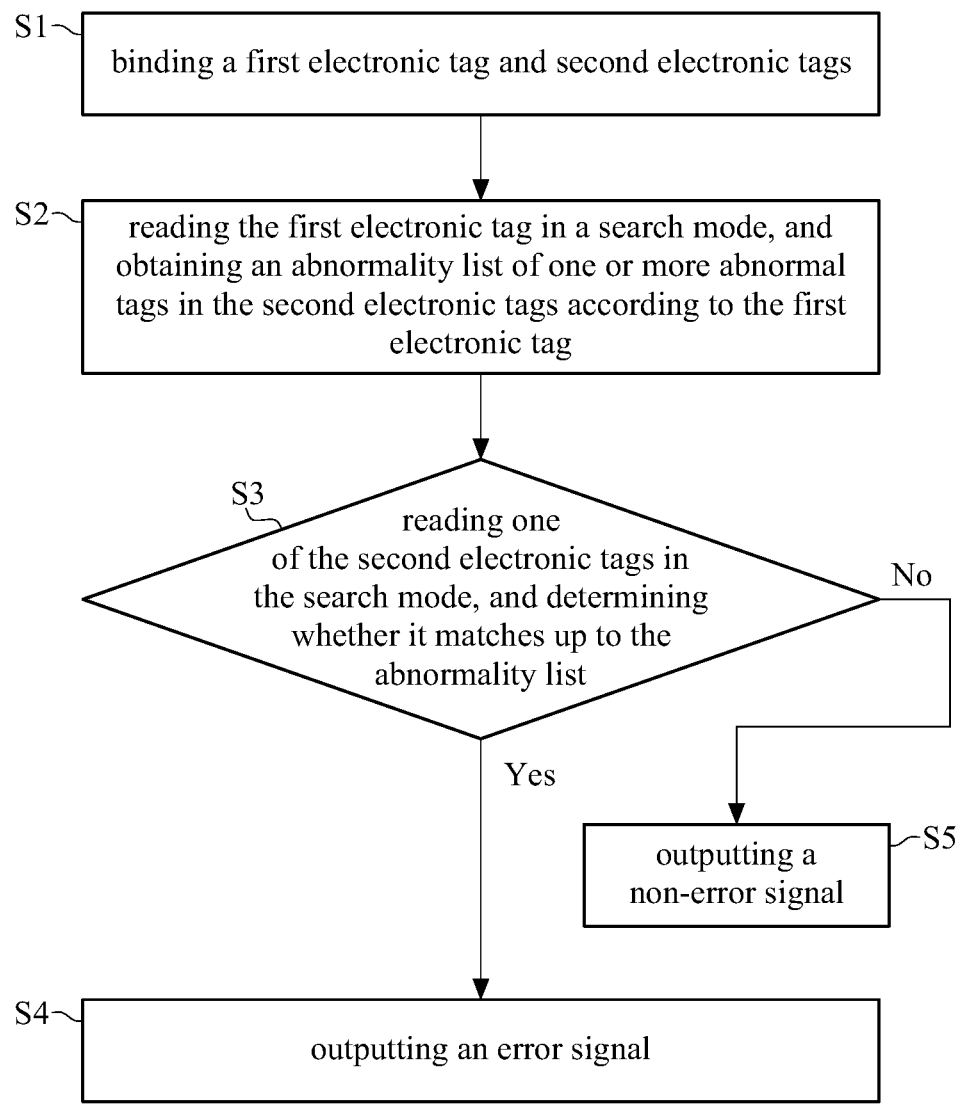
FIG. 2 is a flow chart of an equipment management method based on radio frequency identification according to an embodiment of this disclosure.

Please refer to FIG. 1 and FIG. 2, wherein FIG. 2 is a flow chart of an equipment management method based on radio frequency identification according to an embodiment of this disclosure. The equipment management method shown in FIG. 2 is applicable to the equipment management system 1 shown in FIG. 1, and comprises step S1: binding a first electronic tag and second electronic tags; step S2: reading the first electronic tag in a search mode, and obtaining an abnormality list of one or more abnormal tags in the second electronic tags according to the first electronic tag; step S3: reading one of the second electronic tags in the search mode, and determining whether it matches up to the abnormality list; when the determined result of step S3 is "yes", performing step S4: outputting an error signal; and when the determined result of step S3 is "no", performing step S5: outputting a non-error signal. In the following, the equipment management method shown in FIG. 2 is exemplarily described as being performed by the equipment management system 1 shown in FIG. 1, but it is not intended to limit the equipment management method shown in FIG. 2 to only applicable to the equipment management system 1 shown in FIG. 1.

In step S1, the equipment management system 1 binds a first electronic tag and second tags by the reading device 11 and the computing device 13. More particularly, the reading device 11 of the equipment management system 1 reads the first electronic tag on the test machine 2 and the second electronic tags on the test elements 3a and 3b in a binding mode and transmits the read electronic tags to the computing device 13, and the computing device 13 processes the data of these electronic tags to build the binding between the test machine 2 and the test elements 3a and 3b.

In step S2, the reading device 11 reads the first electronic tag on the test machine 2 in a search mode, and provides the read data of the electronic tag to the computing device 13 to obtain the abnormality list of the abnormal tag(s) in the second electronic tags from the computing device 13. More particularly, the reading device 11 transmits the read data corresponding to the first electronic tag and a signal indicating the search mode to the computing device, and the computing device 13 provides the abnormality list of the abnormal tag(s) in the second electronic tags to the reading device 11 according to the received data and indication signal. In other words, the second electronic tag(s) listed on the abnormality list represent the abnormal tags and correspond to the test element(s) that has a problem and need to be replaced. For example, said problem is that the number of operations of the test element is accumulated to the level at which the test element needs to be replaced (e.g. about 5% remaining in service life).

In step S3, the reading device 11 reads the second electronic tag of one of the test elements 3a and 3b in the search mode, and determines whether it matches up to the abnormality list. More particularly, the reading device 11 can compare the read second electronic tag with the electronic tag(s) listed on the abnormality list so as to determine whether the read second electronic tag is listed on the abnormality list, and if the determined result is "yes", the read second electronic tag matches up to the abnormality list. When the read second electronic tag matches up to the abnormality list, as described in step S4, the reading device 11 outputs an error signal; and when the read second electronic tag does not match up to the abnormality list, as described in step S5, the reading device 11 can output a non-error signal. Or, the reading device 11 merely outputs a warning signal when the read second electronic tag matches up to the abnormality list. Then, the reading device 11 can continue to read another second electronic tag in the search mode, and determine whether it matches up to the abnormality list.

Figure 3:
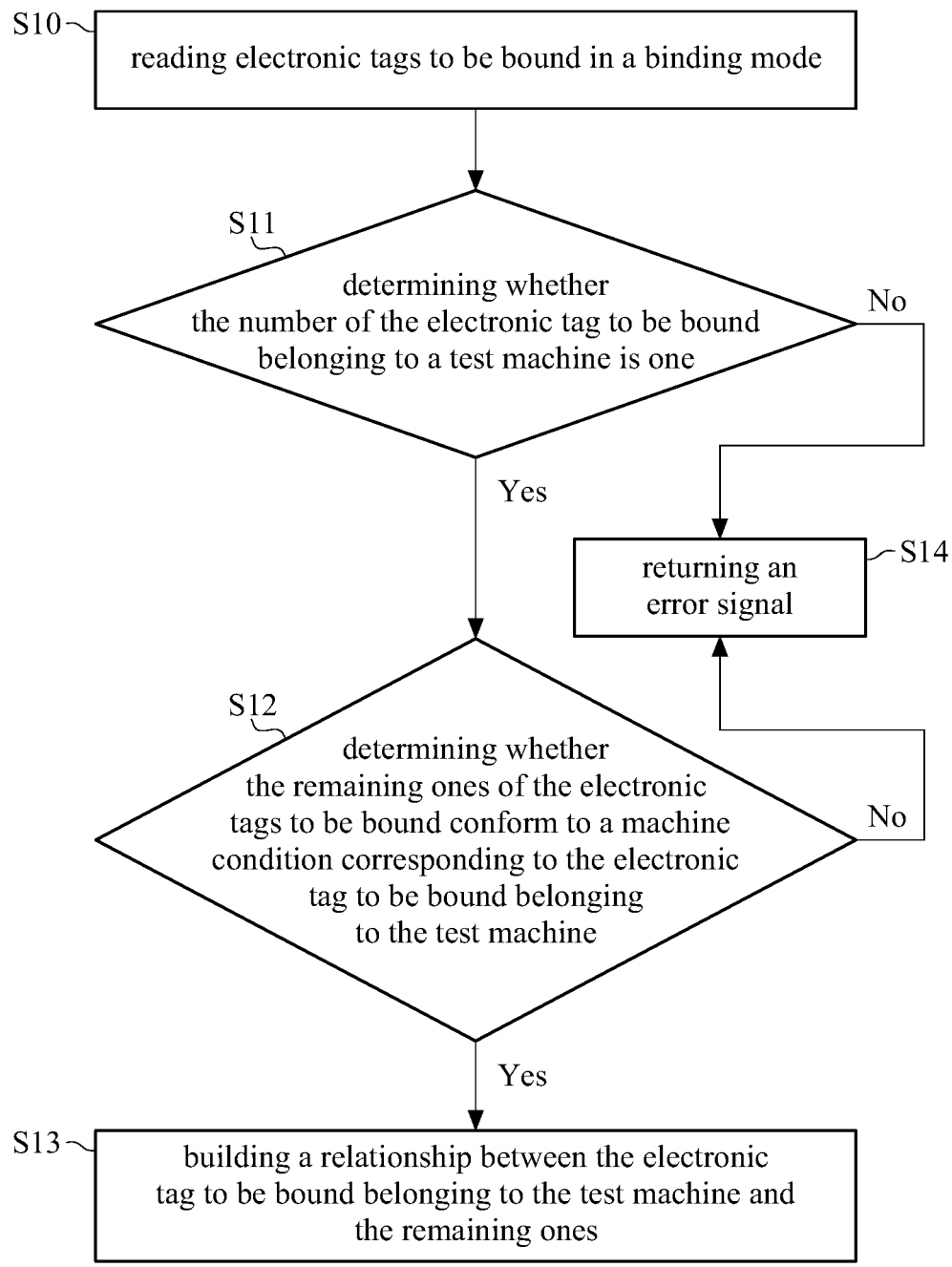
FIG. 3 is a flow chart of a binding task in an equipment management method based on radio frequency identification according to an embodiment of this disclosure.

For a further explanation of the binding task as described in step S1, please refer to FIG. 3, which is a flow chart of a binding task in an equipment management method based on radio frequency identification according to an embodiment of this disclosure. As shown in FIG. 3, the binding task can comprises step S10: reading electronic tags to be bound in a binding mode; step S11: determining whether the number of the electronic tag to be bound belonging to a test machine is one; when the determined result of step S11 is "yes", performing step S12: determining whether the remaining ones of the electronic tags to be bound conform to a machine condition corresponding to the electronic tag to be bound belonging to the test machine; when the determined result of step S12 is "yes", performing step S13: building a relationship between the electronic tag to be bound belonging to the test machine and the remaining ones; and when the determined result of step S11 or step S12 is "no", performing step S14: returning an error signal. In the following, the binding task shown in FIG. 3 is exemplarily described as being performed by the equipment management system 1 shown in FIG. 1, but it is not intended to limit the binding task shown in FIG. 3 to only applicable to the equipment management system 1 shown in FIG. 1.

In step S10, the reading device 11 reads electronic tags to be bound (e.g. the first electronic tag on the test machine 2 and the second electronic tags on the test elements 3a and 3b as aforementioned) in a binding mode. The reading device 11 transmits the read electronic tags to be bound and a signal indicating the binding mode to the computing device 13, and the computing device 13 decides to perform a binding procedure on the electronic tags to be bound according to the signal indicating the binding mode. In step S11, the computing device 13 determines whether the number of the electronic tag to be bound belonging to a test machine is one, that is determining whether merely one of the electronic tags to be bound is set on the test machine 2. More particularly, the computing device 13 can determine whether each electronic tag belongs to the test machine 2 or the test element 3a/3b based on the encoding method of the electronic tag since the electronic tag belonging to the test machine 2 and the electronic tag belonging the test element 3a/3b have different encoding methods, and then the computing device 13 can count the number of the electronic tag(s) belonging to the test machine 2.

When the number of the electronic tag to be bound belonging to the test machine is one, as described in step S12, the computing device 13 determines whether the remaining ones of the electronic tags to be bound conform to the machine condition(s) corresponding to the test machine. More particularly, the database of the computing device 13 stores one or more machine conditions of the test machine 2 (for example, the test elements 3a and 3b disposed in the test machine 2 should be relative to the test machine 2, and a warehouse manager will initially select the test elements 3a and 3b that conform to the relevant test condition(s) of the test machine 2. In other words, the test conditions of test elements in different test machines may be different, so if test elements with different test conditions are installed in a test machine that is not relative to the test elements, it may cause the test to fail or even damage the motherboard, the test machine and/or the test elements) and data such as types and specifications of the test elements 3a and 3b, and the computing device 13 can obtain the machine condition of the test machine 2 according to the electronic tag belonging to the test machine 2 and determine whether the remaining electronic tags to be bound except the electronic tag belonging to the test machine 2 conform to the machine condition.

When the remaining ones of the electronic tags to be bound conform to the machine condition corresponding to the test machine, as described in step S13, the computing device 13 builds the relationship between the electronic tag belonging to the test machine and each of the remaining ones. For the first electronic tag on the test machine 2 and the second electronic tags on the test elements 3a and 3b, the computing device 13 binds the second electronic on the test element 3a to the first electronic tag on the test machine 2, binds the second electronic on the test element 3b to the first electronic tag on the test machine 2, and stores these binding relationships. In other words, the computing device 13 builds the relationships between the electronic tag belonging to a test machine and the remaining electronic tags as determining that the number of the electronic tag to be bound belonging to a test machine is one and the remaining electronic tags except the electronic tag belonging to the test machine conform to the machine condition corresponding to the electronic tag belonging to the test machine.

When the number of the electronic tags to be bound belonging to a test machine is not one (i.e. the determined result of step S11 is "no") or the remaining ones of the electronic tags to be bound do not conform to the machine addition (i.e. the determined result of step S12 is "no"), as described in step S14, the computing device 13 returns an error signal to the reading device 11. More particularly, the reading device 11 can output the error signal in the form of display picture or sound, wherein the error signals corresponding to the negative results of different steps can have different output methods for identification.

Figure 4:
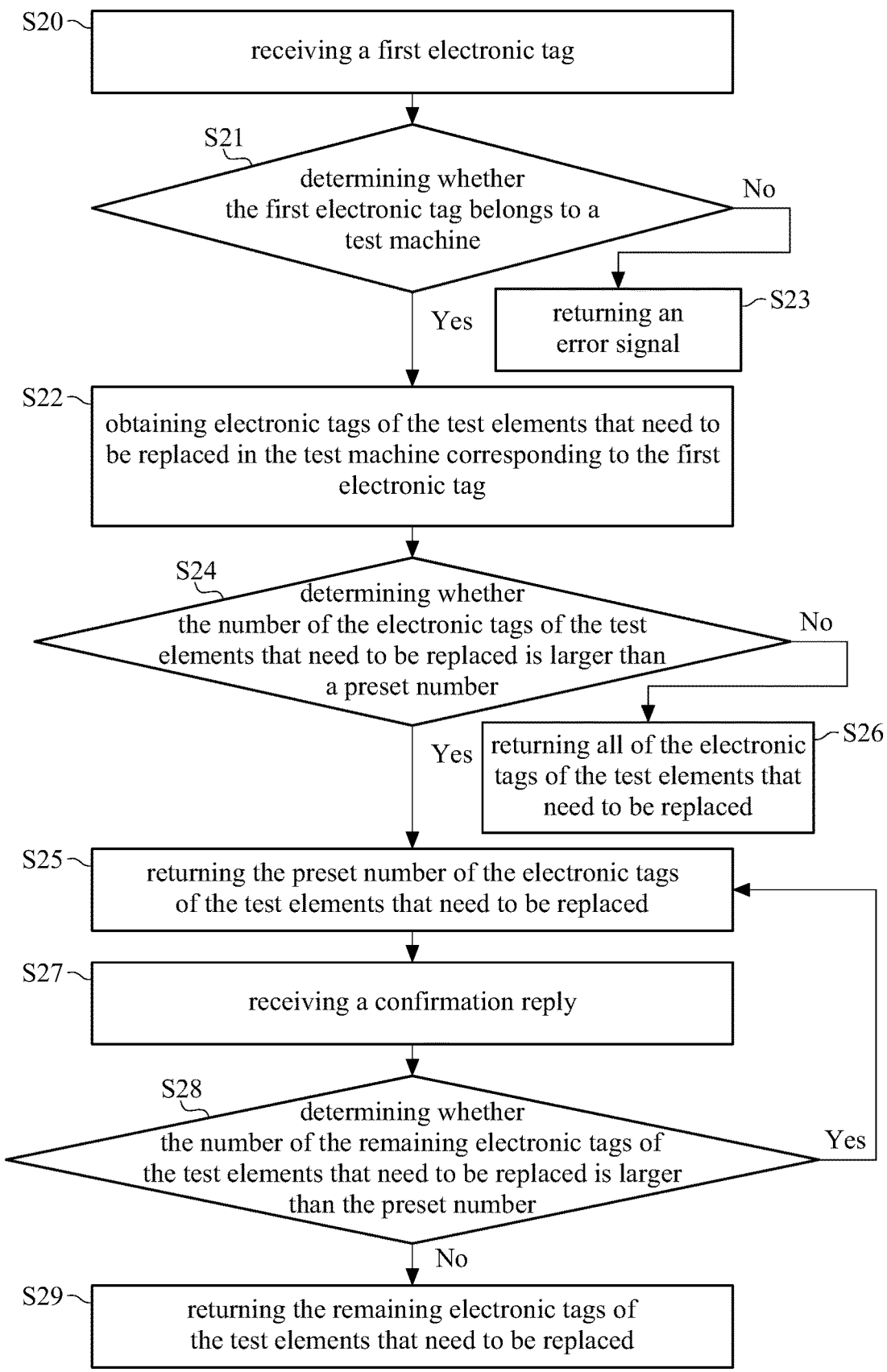
FIG. 4 is a flow chart of generating an abnormality list in an equipment management method based on radio frequency identification according to an embodiment of this disclosure.

For a further explanation of the procedure for generating an abnormality list in step S2 in FIG. 2, please refer to FIG. 4, which is a flow chart of generating an abnormality list in an equipment management method based on radio frequency identification according to an embodiment of this disclosure. As shown in FIG. 4, an abnormality list can be generated by the following steps, comprising step S20: receiving a first electronic tag; step S21: determining whether the first electronic tag belongs to a test machine; when the determined result of step S21 is "yes", performing step S22: obtaining electronic tags of the test elements that need to be replaced in the test machine corresponding to the first electronic tag; when the determined result of step S21 is "no", performing step S23: returning an error signal; step S24: determining whether the number of the electronic tags of the test elements that need to be replaced is larger than a preset number; when the determined result of step S24 is "yes", performing step S25: returning the preset number of the electronic tags of the test elements that need to be replaced; when the determined result of step S24 is "no", performing step S26: returning all of the electronic tags of the test elements that need to be replaced; step S27: receiving a confirmation reply; step S28: determining whether the number of the remaining electronic tags of the test elements that need to be replaced is larger than the preset number; when the determined result of step S28 is "yes", back to step S25; and when the determined result of step S28 is "no", performing step S29: returning the remaining electronic tags of the test elements that need to be replaced. In the following, the procedure for generating an abnormality list shown in FIG. 4 is exemplarily described as being performed by the equipment management system 1 shown in FIG. 1, but it is not intended to limit the procedure for generating an abnormality list shown in FIG. 4 to only applicable to the equipment management system 1 shown in FIG. 1.

In step S20, the computing device 13 receives the first electronic tag read by the search mode from the reading device 11 and the signal indicating the search mode. In step S21, the computing device 13 determines whether the first electronic tag belongs to a test machine. More particularly, when the reading device 11 transmits the data of the electronic tag read using the search mode to the computing device 13, the reading device 11 can also transmit the signal indicating the search mode, and then the computing device 13 can, according to this signal, decide to perform determining whether the read electronic tag belongs to a test machine and the procedure of generating an abnormality list as described later. More specifically, the computing device 13 can determine whether the electronic tag belongs to a test machine or a test element according to the encoding method of the electronic tag.

When the computing device 13 determines that the first electronic tag belongs to a test machine, as described in step S22, the computing device 13 obtains the electronic tag(s) of the test element(s) that needs to be replaced (one or both of the test elements 3a and 3b) in the test machine 2 corresponding to the first electronic tag. As aforementioned, the computing device 13 stores the binding between the electronic tag of a test machine and the electronic tags of test elements, and have specific marks for the electronic tags of the test elements that need to be replaced. Therefore, the computing device 13 can obtain the electronic tag(s) of the test element(s) that is bound to the first electronic tag and marked to be replaced. When the computing device 13 determines that the first electronic tag does not belong to a test machine, as described in step S23, the computing device 13 can return an error signal to the reading device 11. More particularly, the reading device 11 can output the error signal in the form of display picture or sound.

In step S24, the computing device 13 determines whether the number of the electronic tags of the test elements that need to be replaced is larger than a preset number. For example, the preset number is 255. When the determined result of step S24 is "yes", as described in step S25, the computing device 13 returns the preset number of the electronic tags of the test elements that need to be replaced to the reading device 11; when the determined result of step S24 is "no", as described in step S26, the computing device 13 returns all of the electronic tags of the test elements that need to be replaced to the reading device 11. In step S27 and step S28, after returning the preset number of the electronic tags of the test elements that need to be replaced to the reading device 11, the computing device 13 waits for an ACK signal (i.e. confirmation reply as aforementioned) from the reading device 11, and as receiving the ACK signal, the computing device 13 continues to determine whether the number of the remaining electronic tags of the test elements that need to be replaced is larger than the preset number. When the determined result is "yes", the computing device 13 performs step S25 again; when the determined result is "no", the computing device 13 returns all of the remaining electronic tags of the test elements that need to be replaced to the reading device 11. By the above-mentioned batch transmission method, the problem of timeout caused by the lengthened transmission time resulted from transmitting too large amount of data at one time may be avoided.

The electronic tag(s) of the test element(s) that needs to be replaced is returned to the reading device 11 as the abnormality list described in step S2 in FIG. 2. The reading device 11 can perform the subsequent search for the test element(s) that needs to be replaced according to this abnormality list (i.e. step S3 in FIG. 2). By the binding task of the electronic tag of a test machine and the electronic tags of test elements and the search task in which the electronic tag of the test machine is firstly read to obtain the abnormality list of the test element(s) that needs to be replaced as aforementioned, in an implementation where multiple test machines are managed, merely the electronic tag(s) of the test element(s) that need to be replaced in the test machine corresponding to the read electronic tag are obtained for comparison, without comparing a target electronic tag with each of the electronic tags of the test elements that need to be replaced in all the test machines. Therefore, the computation load of the system during the search task may be reduced and the execution speed of the search task may be increased. Moreover, instead of a reading device with a high computing power, a low-cost RFID handheld device may be used to perform the search task, thereby reducing the cost of system setup.

Figure 5:
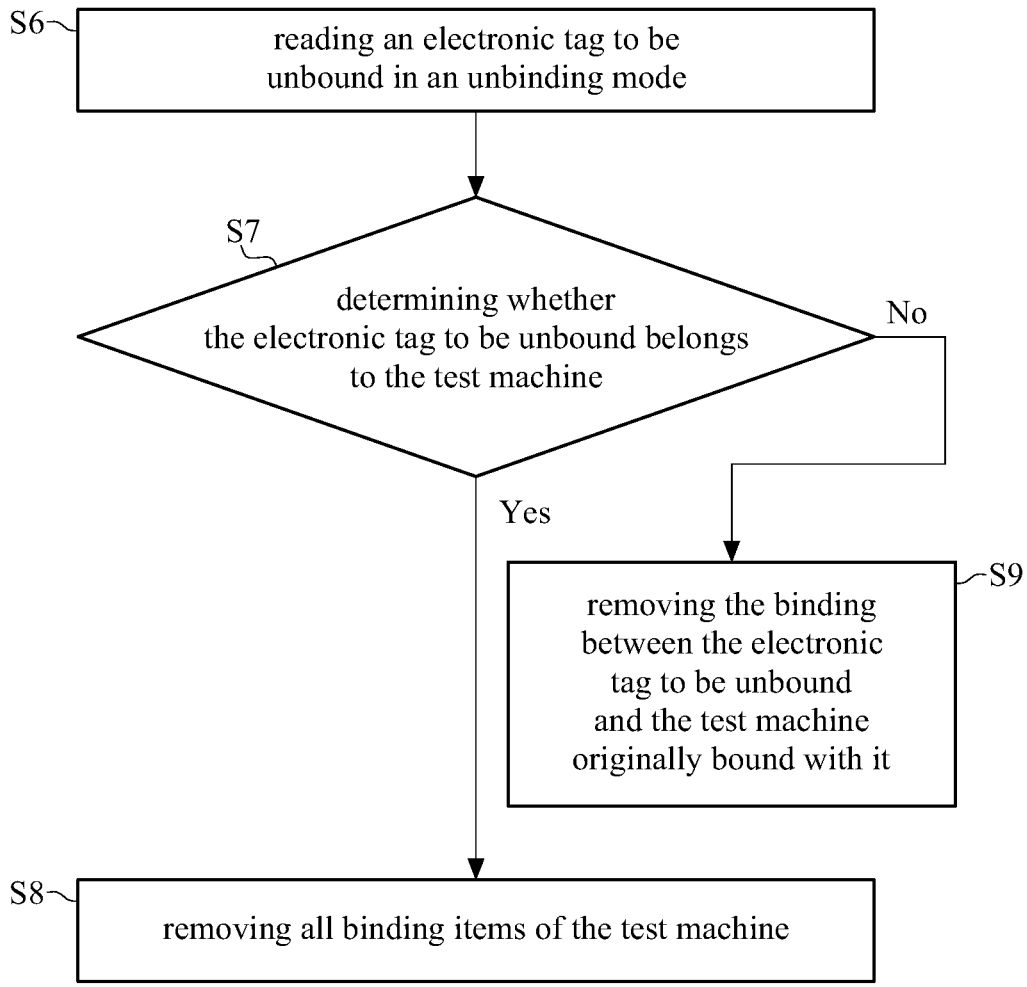
FIG. 5 is a flow chart of an unbinding task in an equipment management method based on radio frequency identification according to an embodiment of this disclosure.

As above-mentioned, the equipment management system 1 can perform the binding task by the reading device 11 and the computing device 13 binding task. Relatively, in another embodiment, the reading device 11 and the computing device 13 can further perform an unbinding task. Please refer to FIG. 5, which is a flow chart of an unbinding task in an equipment management method based on radio frequency identification according to an embodiment of this disclosure. As shown in FIG. 5, an unbinding task can comprises step S6: reading an electronic tag to be unbound in an unbinding mode; step S7: determining whether the electronic tag to be unbound belongs to a test machine; when the determined result of step S7 is "yes", performing step S8: removing all binding items of the test machine; when the determined result of step S7 is "no", performing step S9: removing the binding between the electronic tag to be unbound and the test machine originally bound with it. In the following, the unbinding task shown in FIG. 5 is exemplarily described as being performed by the equipment management system 1 shown in FIG. 1, but it is not intended to limit the unbinding task shown in FIG. 5 to only applicable to the equipment management system 1 shown in FIG. 1.

In step S6, the reading device 11 reads an electronic tag to be unbound in an unbinding mode. The reading device 11 transmits the read electronic tag to be unbound and a signal indicating the unbinding mode to the computing device 13, and the computing device 13 decides to perform an unbinding procedure on the electronic tag to be unbound according to the signal indicating the unbinding mode. In step S7, the computing device 13 determines whether the electronic tag to be unbound belongs to a test machine. More particularly, the computing device 13 can determine whether the electronic tag to be unbound belongs to a test machine or a test element according to the encoding method of the electronic tag to be unbound. When the electronic tag to be unbound belongs to a test machine, as described in step S8, the computing device 13 removes all binding items of the test machine to which the electronic tag to be unbound belongs. In an example where the first electronic tag serves as the electronic tag to be unbound, the computing device 13 determines that the first electronic tag belongs to the test machine 2, and accordingly removes the binding between the first electronic tag and the second electronic tags belonging to the test elements 3a and 3b. When the electronic tag to be unbound belongs to a test element, as described in step S9, the computing device 13 removes the binding between the electronic tag to be unbound and the test machine originally bound with it. In an example where the second electronic tag of the test element 3a serves as the electronic tag to be unbound, the computing device determines that the second electronic tag belongs to the test element 3a, and accordingly removes the binding between the second electronic tag of the test element 3a and the first electronic tag.

In particular, when the reading device 11 of the equipment management system 1 determines that the second electronic tag of a specific test element matches up to the abnormality list, which represents that the specific test element should be replaced, the reading device 11 performs the unbinding task on the second electronic tag. In other words, step S4 shown in FIG. 2 can be followed by steps S6, S7 and S9 shown in FIG. 5 in which the second electronic tag(s) corresponding to the test element(s) that needs to be replaced is considered to be the electronic tag(s) to be unbound, and its binding with the first electronic tag is removed.

In addition to the aforementioned binding mode, search mode and unbinding mode, the reading device 11 can also have a free reading mode. In the free reading mode, the value of the electric wave power (RF power) of the reading device 11 can be adjusted. More particularly, the reading device 11 can use a first electric wave power to read the first electronic tag on the test machine 2, and use a second electric wave power which is different from the first electric wave power to read a third electronic tag on another test machine, wherein said another test machine belongs to a different production line from the test machine 2. Through the above method of reading electronic tags of different production lines with different electric wave powers, the interference of signals from the different production lines may be eliminated. Moreover, with the function of adjustable electric wave power, the reading device 11 may be applied to a variety of Bakelite jig structures and tag types, and its flexibility of use may be increased.

In particular, the reading task performed on the electronic tag(s) in the binding mode, search mode, unbinding mode or free reading mode as aforementioned can be performed by an automatic machine controlling the reading device, or by personnel operating the reading device 11.

Figure 6:
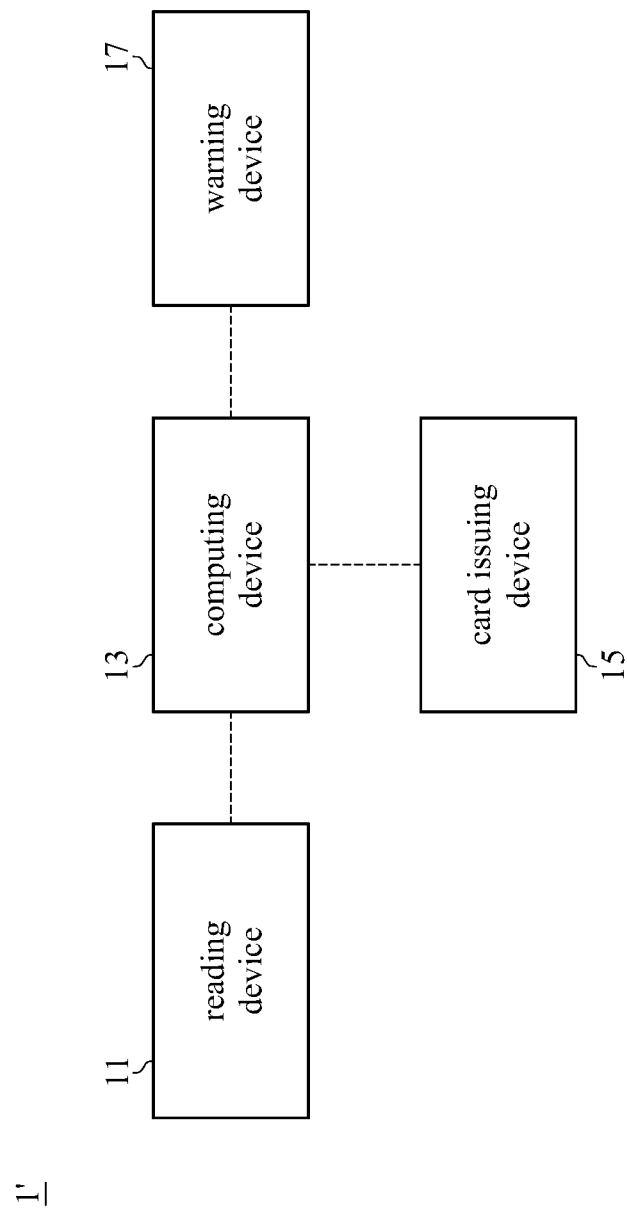
FIG. 6 is a function block diagram of an equipment management system based on radio frequency identification according to another embodiment of this disclosure.

Moreover, this disclosure also provides an equipment management system with one or both of card issuing mechanism and warning mechanism. Please refer to FIG. 6, which is a function block diagram of an equipment management system based on radio frequency identification according to another embodiment of this disclosure. As shown in FIG. 6, an equipment management system 1' comprises a reading device 11, a computing device 13, a card issuing device 15 and a warning device 17, wherein the reading device 11 and the computing device 13 have the same operations as the reading device 11 and the computing device 13 of FIG. 5, so the details are not repeated.

The card issuing device 15 is, for example, a combination of RFID card issuing machine and workstation computer, and can be connected with the computing device 13 via a wireless network. Before the reading device 11 and the computing device 13 binds the test machine and the test elements, the card issuing device 15 can be used to bind the electronic tag on the test machine to the identity number (such as serial number) of the test machine, and bind the electronic tag on the test element to the identity number (such as serial number) of the test element. More particularly, the card issuing device 15 can receive an electronic tag, an identity number and a binding instruction (e.g. input by personnel), and accordingly check whether there is an error condition (such as duplicate tag binding, wrong tag coding, wrong test element, etc.). As finding out an error condition, the card issuing device 15 shows the corresponding error information; as there is no error condition, the card issuing device 15 build the binding between the electronic tag and the identity number.

The warning device 17 is, for example, a siren, a warning light or other alarm output components, or/and an output interface of a wireless message (email, text message, etc.). The warning device 17 can be connected with the computing device 13 via a wireless network. As aforementioned, the computing device 13 can count the use times of the test element and record the test element(s) that needs to be replaced. When the service life of the test element is about to end, the computing device 13 can send an alarm by the warning device 17. As receiving the alarm, production line personnel or management personnel can set the reading device to the search mode, and then operate the equipment management system 1 to perform the search task as described in steps S2-S5 in the aforementioned embodiment of FIG. 2, in order to find and replace the test element(s) that needs to be replaced for troubleshooting.

In view of the above description, the equipment management method and system based on radio frequency identification provided in this disclosure may read the electronic tags of test elements inside a test machine without disassembling the test machine. By the specific binding task and searching task of the equipment management method and system provided in this disclosure, the amount of comparison data in the search for the test elements that need to be replaced may be reduced, thereby reducing the computation load and speeding up the execution speed. Moreover, instead of a reading device with a high computing power, a low-cost device may be used to perform the search task in this disclosure, thereby reducing the cost of system setup.

In an embodiment of this disclosure, the server of this disclosure can be used for artificial intelligence (AI) computing or edge computing, and can be used as a 5G server, a cloud server or a server in Internet of Vehicle (IoV).

What is claimed is:

1. An equipment management method based on radio frequency identification, comprising:
    binding a first electronic tag and second electronic tags;
    reading the first electronic tag in a search mode, and obtaining an abnormality list of one or more abnormal tags in the second electronic tags according to the first electronic tag;
    reading one of the second electronic tags in the search mode; and
    outputting an error signal when the read second electronic tag matches up to the abnormality list;
    wherein the first electronic tag is set on a test machine, the second electronic tag are respectively set on test elements, and the test elements are disposed in the test machine.

2. The equipment management method according to claim 1, wherein binding the first electronic tag and the second electronic tags comprises:
    reading electronic tags to be bound in a binding mode; and
    when one of the electronic tags to be bound belongs to the test machine and remaining ones of the electronic tags to be bound conform to a machine condition corresponding to the one of the electronic tags to be bound belonging to the test machine, building a relationship between the one of the electronic tags to be bound belonging to the test machine and the remaining ones;
    wherein the one of the electronic tags to be bound belonging to the test machine serves as the first electronic tag, and the remaining ones serve as the second electronic tags.

3. The equipment management method according to claim 1, further comprising:
    reading an electronic tag to be unbound in an unbinding mode;
    when the electronic tag to be unbound is one of the second electronic tags, removing binding between the electronic tag to be unbound and the first electronic tag; and
    when the electronic tag to be unbound is the first electronic tag, removing binding between the second electronic tags and the first electronic tag.

4. The equipment management method according to claim 1, further comprising:
    binding the first electronic tag and an identity number of the test machine; and for each of the second electronic tags, binding the second electronic tag and an identity number of a respective one of the test elements.

5. The equipment management method according to claim 1, wherein the first electronic tag is read using a first electric wave power, and the equipment management method further comprising:

reading a third electronic tag using a second electric wave power;

wherein the third electronic tag is set on another test machine belonging to a different production line from the test machine, and the first electric wave power is different from the second electric wave power.

6. An equipment management system based on radio frequency identification, comprising:

a reading device configured to reading a first electronic tag in a search mode, and obtaining an abnormality list of one or more abnormal tags in second electronic tags according to the first electronic tag, to read one of the second electronic tags in the search mode, and to output an error signal when the read second electronic tag matches up to the abnormality list; and a computing device connected with the reading device, and configured to provide the abnormality list to the reading device according to the first electronic tag;

wherein the first electronic tag is set on a test machine, the second electronic tag are respectively set on test elements, the test elements are disposed in the test machine, and the reading device and the computing device are further configured to bind the first electronic tag and the second electronic tags.

7. The equipment management system according to claim 6, wherein binding the first electronic tag and the second electronic tags performed by the reading device and the computing device comprises the reading device reading electronic tags to be bound in a binding mode, and when one of the electronic tags to be bound belongs to the test machine and remaining ones of the electronic tags to be bound conform to a machine condition corresponding to the one of the electronic tags to be bound belonging to the test machine, the computing device building a relationship between the one of the electronic tags to be bound belonging to the test machine and the remaining ones, wherein the one of the electronic tags to be bound belonging to the test machine serves as the first electronic tag, and the remaining ones serve as the second electronic tags.

8. The equipment management system according to claim 6, wherein the reading device is further configured to read an electronic tag to be unbound in an unbinding mode, and the computing device is further configured to remove binding between the electronic tag to be unbound and the first electronic tag when the electronic tag to be unbound is one of the second electronic tags, and to remove binding between the second electronic tags and the first electronic tag when the electronic tag to be unbound is the first electronic tag.

9. The equipment management system according to claim 6, further comprising a card issuing device, wherein the card issuing device is connected with the computing device, and configured to bind the first electronic tag and an identity number of the test machine, and for each of the second electronic tags, to bind the second electronic tag and an identity number of a respective one of the test elements.

10. The equipment management system according to claim 6, wherein the reading device reads the first electronic tag using a first electric wave power, and is further configured to read a third electronic tag using a second electric wave power, wherein the third electronic tag is set on another test machine belonging to a different production line from the test machine, and the first electric wave power is different from the second electric wave power.

* * * * *